US 10,759,380 B2

(12) United States Patent
Heinrich

(10) Patent No.: US 10,759,380 B2
(45) Date of Patent: Sep. 1, 2020

(54) BELT TIGHTENER, SAFETY BELT DEVICE, AND METHOD FOR OPERATING A SAFETY BELT DEVICE

(71) Applicant: DAIMLER AG, Stuttgart (DE)

(72) Inventor: Till Heinrich, Stuttgart (DE)

(73) Assignee: DAIMLER AG, Stuttgart (DE)

( * ) Notice: Subject to any disclaimer, the term of this patent is extended or adjusted under 35 U.S.C. 154(b) by 46 days.

(21) Appl. No.: 16/328,400

(22) PCT Filed: Aug. 4, 2017

(86) PCT No.: PCT/EP2017/000950
§ 371 (c)(1),
(2) Date: Feb. 26, 2019

(87) PCT Pub. No.: WO2018/041390
PCT Pub. Date: Mar. 8, 2018

(65) Prior Publication Data
US 2019/0193675 A1   Jun. 27, 2019

(30) Foreign Application Priority Data
Aug. 27, 2016 (DE) .................. 10 2016 010 431

(51) Int. Cl.
*B60R 22/46*   (2006.01)

(52) U.S. Cl.
CPC ........ *B60R 22/46* (2013.01); *B60R 2022/468* (2013.01); *B60R 2022/4666* (2013.01)

(58) Field of Classification Search
CPC .............. B60R 22/46; B60R 2022/468; B60R 2022/4666
See application file for complete search history.

(56) References Cited

U.S. PATENT DOCUMENTS

| 4,553,948 | A | * | 11/1985 | Tatsuno | ............... | B25B 23/1453 |
| | | | | | | 173/93.5 |
| 4,767,379 | A | * | 8/1988 | Schoeps | .................. | B25B 21/02 |
| | | | | | | 173/93.5 |
| 5,429,553 | A | * | 7/1995 | Schoeps | .................. | B25B 21/02 |
| | | | | | | 464/25 |
| 6,644,426 | B1 | * | 11/2003 | Larue | ..................... | A61G 5/042 |
| | | | | | | 180/9.1 |
| 8,075,019 | B2 | * | 12/2011 | Specht | .................... | B60R 22/46 |
| | | | | | | 280/806 |

(Continued)

FOREIGN PATENT DOCUMENTS

| DE | 102007032714 A1 | 1/2009 |
| DE | 102009005301 A1 | 7/2010 |

(Continued)

OTHER PUBLICATIONS

Examination Report created on May 2, 2017 in related/corresponding DE Application No. 10 2016 010 431.7.

(Continued)

*Primary Examiner* — Darlene P Condra
(74) *Attorney, Agent, or Firm* — Patent Portfolio Builders PLLC

(57) ABSTRACT

A belt tightener for tightening a safety belt in a vehicle includes an impulse screw drive unit to generate a greater torque than can be achieved by a mechanical coupling between a motor and the belt tightener.

10 Claims, 3 Drawing Sheets

(56) References Cited

U.S. PATENT DOCUMENTS

2003/0209624 A1* 11/2003 Biller ................. B60R 22/46
                 242/390.8
2016/0207497 A1* 7/2016 Seal ................. B60N 2/2893

FOREIGN PATENT DOCUMENTS

| EP | 0254699 A1 | 1/1988 |
| EP | 0569344 A1 | 11/1993 |
| EP | 1475280 A1 | 11/2004 |
| EP | 2239099 A2 | 10/2010 |
| EP | 2489473 A2 | 8/2012 |

OTHER PUBLICATIONS

International Search Report dated Oct. 10, 2017 in related/corresponding International Application No. PCT/EP2017/000950.
Written Opinion dated Oct. 10, 2017 in related/corresponding International Application No. PCT/EP2017/000950.

\* cited by examiner

BELT TIGHTENER, SAFETY BELT DEVICE, AND METHOD FOR OPERATING A SAFETY BELT DEVICE

BACKGROUND AND SUMMARY OF THE INVENTION

Exemplary embodiments of the invention relate to a belt tightener for tightening a safety belt in a vehicle. Exemplary embodiments also relate to a safety belt device comprising a belt tightener of this kind. Furthermore, exemplary embodiments relate to a method for operating a safety belt device of this kind.

A belt tightener is generally known as a passive safety device that is intended to be arranged in a vehicle. By means of a belt tightener of this kind, a safety belt can be automatically tightened in the case of a collision or an imminent collision of the vehicle such that the safety belt is tightened against the body of a vehicle occupant. As a result, the vehicle occupant participates in a total deceleration of the vehicle caused by the collision comparatively early. A reversible belt tightener comprises an electric motor and is coupled to a belt retraction device of a safety belt device. Alternatively or additionally, pyrotechnic belt tighteners are used, which are not reversible, however. The safety belt device is also coupled to a driver assist device for actuating the belt tightener, the driver assist device comprising sensors for detecting collision-related information.

Exemplary embodiments of the invention are directed to a belt tightener that is improved with respect to the prior art, an improved safety belt device comprising a belt tightener of this kind, and an improved method for operating a safety belt device of this kind.

According to embodiments of the invention, a belt tightener for tightening a safety belt in a vehicle comprises an impulse screw drive unit.

In the impulse screw drive unit, a force is transmitted from a drive component to an output component that can be connected to the belt retraction device, the drive component and the output component being mechanically decoupled from one another in the second ignition stage. In this case, force is not transmitted continuously, but in a pulse-like manner, with generated angular momentum peaks increasing asymptotically. The second ignition stage is activated, in particular, in the case of an impending unavoidable collision.

Even though the term "ignition stage" suggests pyrotechnics, here and in the following, this generally means an actuation stage occurring without the use of pyrotechnics, if not otherwise clear from the context.

By means of the impulse screw drive unit, a maximum torque of a belt retraction device that can be connected to the belt tightener can be increased with respect to conventional electromotive belt tighteners when the second ignition stage is activated. This makes it possible to generate a tightening force that is as comparably high as a tightening force that can be generated by means of a pyrotechnic belt tightener. The belt tightener is in this case reversible and can be reused after its actuation, i.e., after a collision. In particular, by means of the impulse screw drive unit, a number of electrical connection elements can be reduced with respect to conventional belt tighteners that comprise an additional pyrotechnic ignition unit. The pyrotechnic ignition unit in a conventional belt tightener having a second ignition stage requires its own cable set for the pyrotechnic tightener. A control device connected to the belt tightener likewise requires a second output for controlling the second ignition stage. By means of the impulse screw drive unit, the two ignition stages of the belt tightener can be activated using just one cable set and an overcurrent control means. The belt tightener therefore has a simple control system and is purely mechanical.

In other words: Nowadays, vehicles that have PRE-SAFE and reversible retraction tighteners experience reversible retraction tightening before the collision and in the case of a detected critical situation. The pyrotechnic retraction tightener is then ignited during the crash. Using the invention, the PRE-SAFE phase would remain the same and the electric motor would tighten the belt. Activating the second ignition stage or actuation stage before or during the crash is new. This sets the described impulse mechanism in the same unit into action.

According to one embodiment, the impulse screw drive unit comprises an electric motor as a drive component, a container filled with a hydraulic fluid and an output component, the electric motor being connected to the container for conjoint rotation and the output component being arranged at least in part in the container. As a result, when the second ignition stage is activated, hydraulic coupling between the electric motor and the output component is possible such that a higher torque can be transmitted to the output component than the electric motor can generate. When the first ignition stage is activated, the electric motor and the output component are mechanically coupled to one another, since a lower torque is sufficient in this case. The electric motor is therefore mechanically decoupled from the output component when the second ignition stage is activated. An impulse screw drive unit structure of this kind is already known. The impulse screw drive unit can thereby be simply integrated in the belt tightener.

Force is in this case transmitted from the electric motor to the output component via the hydraulic fluid in the container, the hydraulic fluid being an oil, for example, in particular a hydraulic oil. The container comprises a receiving region for receiving the hydraulic fluid, which region has an elliptical cross-section, for example. An inner diameter of the receiving region is in this case reduced by means of at least one rib-like projection which projects radially inwards. For example, four projections are provided which are equally distributed over a circumference of the receiving region. The shape of the cross-section and the reduced inner diameter in this case make it possible to seal particular regions of the receiving region such that the hydraulic fluid can dam up therein and exert pressure on the output component.

Alternatively, the impulse screw drive unit can also have a spring element instead of a hydraulic fluid, which spring element is coupled to the output component and the electric motor. The electric motor is in this case mechanically decoupled from the output component when the second ignition stage is activated. This makes it possible for pretensioning of the spring element to be influenced by means of the electric motor, with a pulse-like rotational movement of the output component occurring when the pretensioning is triggered.

The output component passes through the receiving region and is a spindle, for example, which has at least one drive element that projects radially outwards in the region of the container. In particular, the output component has two drive elements that are opposite one another in the circumferential direction. By means of the drive elements, the output component has a particular outer diameter corresponding to an inner diameter of the receiving region that is formed by means of two opposing rib-like projections. The drive elements are used in this case to transmit force from the hydraulic fluid to the output component or from the spring element to the output component.

The container is rotated about a rotational axis by means of the electric motor when the impulse screw drive unit is in operation. In this case, a rotational speed of the container is constant. Within the first ignition stage, the output component is rotated together with the container, since the electric motor is in this case still mechanically coupled directly to the output component. In the second ignition stage, the electric motor is decoupled from the output component such that the container and therefore also the receiving region comprising the projections, which region is filled with the hydraulic fluid, move relative to the output component. If the projections reach the same angular position as the drive elements during a rotation of the container, partial regions of the receiving region are sealed from one another since the drive elements abut the projections. This produces chambers that have different pressures since, as a result of the inertia, the hydraulic fluid flows further in the drive direction and a pressure is therefore exerted on the drive elements in the drive direction. The drive elements are therefore subjected to this pressure and convey the pressure to the output component to which the drive elements are rigidly connected. As a result, the output component rotates relative to the container until the drive elements do not abut the projections and the hydraulic fluid can flow freely again. This short rotational movement occurs in pulses. Since the output component can be rigidly connected to the shaft of the belt retraction device, this also rotates in pulses when connected.

After the pulse-like rotational movement of the output component, the container further rotates relative to the output component until the projections again reach the same angular position as the drive elements. This process repeats with each rotation of the container. As the number of rotations increases, the pulse-like rotational movements become asymptotically greater until a maximum value is reached. In so doing, a maximum torque of the output component can be increased with respect to a direct coupling to an electric motor. The maximum torque is in this case comparable to a maximum torque when a pyrotechnic belt tightener is used.

A safety belt device of a vehicle is also provided which comprises a belt retraction device comprising a shaft for unwinding and winding a safety belt in the vehicle and a belt tightener according to the invention or an embodiment of the belt tightener.

The safety belt device designed in this way makes it possible to use a reversible belt tightener that generates a tightening force when a second ignition stage is activated, which force is as comparably high as a tightening force that can be generated by means of a pyrotechnic belt tightener. As a result, the tightening force can be adapted, in particular, to an occupant and collision severity.

For this purpose, the output component of the impulse screw drive unit is connected to the shaft of the belt retraction device for conjoint rotation, such that a maximum torque can be transmitted to the shaft of the belt retraction device.

In a further embodiment, the safety belt device comprises a control unit coupled to the belt tightener, the control unit being coupled to a plurality of detection units for detecting collision-relevant information, and it being possible, by means of the control unit, to generate a control signal based on detected collision-relevant information in order to activate the belt tightener. The tightening force can therefore be adapted to an occupant and collision severity by means of the control unit. Furthermore, it is also possible, by means of the control unit, to activate the belt tightener even before the collision has occurred, such that the window of time until the maximum torque is reached is optimally used and the occupant participates in a total deceleration of the vehicle caused by the collision comparatively early. In this case, activation of the second ignition stage of the belt tightener is required, in particular, in the case of a collision that is classified as unavoidable.

A method for operating a safety belt device of a vehicle is also provided, in which the belt tightener is activated before the occurrence of a detected impending collision of the vehicle and a required tightening force is specified based on the collision-relevant information. In this case, a first ignition stage of the belt tightener is activated at a specific tightening force, at which the output component rotates so as to correspond with the electric motor. A second ignition stage of the belt tightener is activated at a further specific, in particular higher, tightening force, at which the output component rotates relative to the electric motor in a pulse-like manner. In this case, a period of time until the maximum torque is reached can be optimally used such that the occupant is positioned in the direction of a backrest comparatively early, as a result of which the danger of the cervical spine overstretching, which is referred to as the whiplash effect, is substantially avoided or at least reduced.

BRIEF DESCRIPTION OF THE DRAWING FIGURES

Embodiments of the invention are explained in greater detail in the following with reference to the drawings.

In the drawings.

Parts which correspond to one another are provided with the same reference numerals in all drawings.

DETAILED DESCRIPTION

Figure 1:
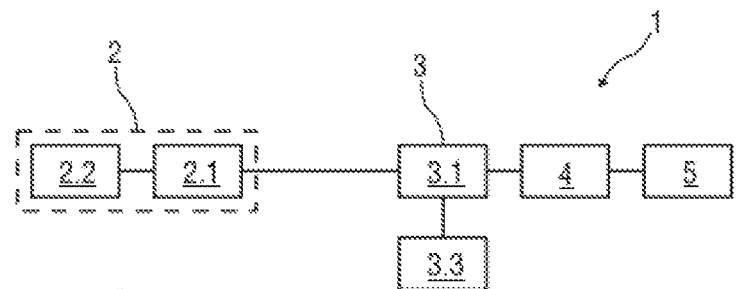
FIG. 1 is a block diagram of a safety belt device.

FIG. 1 shows a block diagram of a safety belt device 1 of a vehicle that is not shown in greater detail.

The safety belt device 1 comprises a belt retraction device 2, a belt tightener 3 and a control unit 4. The safety belt device 1 is in this case arranged in an interior space of the vehicle and is associated with a vehicle seat that is also not shown in greater detail. A safety belt device 1 of this kind is preferably associated with each vehicle seat.

The belt retraction device 2 comprises a shaft 2.1 as a belt reel onto which a safety belt 2.2, also referred to as a belt strap, is rolled.

Figure 2:
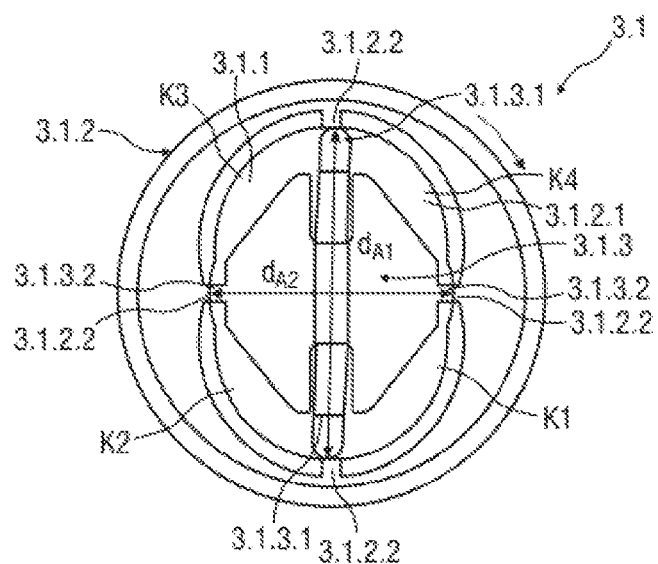
FIG. 2 is a schematic sectional view of an impulse screw drive unit having a hydraulic coupling between an electric motor and an output component and FIGS. 3 to 5 are schematic sectional views of an impulse screw drive unit having a mechanical coupling between an electric motor and an output component in various states.

The belt tightener 3 is reversible and comprises an impulse screw drive unit 3.1 comprising an electric motor 3.3, the impulse screw drive unit 3.1 being shown and described in greater detail in FIG. 2. The impulse screw drive unit 3.1 is in this case coupled to the shaft 2.1 of the belt retraction device 2 such that, by means of the belt tightener 3, the safety belt 2.2 can be automatically tightened in the case of a detected impending collision of the vehicle or in the case of a detected collision in such a way that the safety belt 2.2 is tightened against the body of an occupant. This enables a restraining effect of the safety belt 2.2, in which the occupant participates in a total deceleration of the vehicle caused by the collision comparatively early.

In order to detect an impending collision of the vehicle, the control unit 4 is provided which is coupled to a plurality of detection units 5, e.g., radar sensors, ultrasound sensors, cameras, etc., arranged in and/or on the vehicle. The control unit 4 is in this case capable of detecting the severity of the impending collision using detected collision information. The control unit 4 can also be supplied with information relating to an occupant, e.g., weight, height, etc., by means of further detection units (not shown) and/or by means of other control elements. The control unit 4 is in this case coupled to the impulse screw drive unit 3.1 such that it is possible to activate the belt tightener 3 on the basis of the detected collision information even before the collision has occurred. In particular, at least two ignition stages can be produced by means of the impulse screw drive unit 3.1, a second ignition stage being activated in the case of an unavoidable collision and it therefore being possible to generate a maximum tightening force by means of which injuries to the occupant caused by the collision can at least be reduced.

FIG. 2 is a sectional view, in particular a cross-sectional view, of an embodiment of the impulse screw drive unit 3.1.

The impulse screw drive unit 3.1 comprises the electric motor 3.3 as a drive component, a container 3.1.2 filled with a hydraulic fluid 3.1.1, and an output component 3.1.3.

The electric motor 3.3 is a DC motor, for example, and connected to the container 3.1.2 for conjoint rotation. Since the installation space for arranging the belt tightener 3 is very limited in modern vehicles, only electric motors having a low power consumption can be used. This means that a maximum torque of the electric motor 3.3 is low compared with electric motors having a higher power consumption. When the electric motor 3.3 is mechanically coupled directly to the output component 3.1.3, only the maximum torque of the electric motor 3.3 can therefore be transmitted. The output component 3.1.3 rotates in accordance with the torque generated by the electric motor 3.3, and the safety belt 2.2 is rolled onto the shaft 2.1. When rolling up, a tightening force is generated on the basis of the torque of the shaft 2.1.

A torque can be transmitted to the output component 3.1.3 by means of pyrotechnic belt tighteners, which torque is significantly increased with respect to the use of an electric motor 3.3 that is mechanically coupled to the output component 3.1.3. This also increases a tightening force. In order to transmit a tightening force to the safety belt 2.2 that is as comparably high as using a pyrotechnic belt tightener, an electric motor 3.3 is, on the basis of collision-relevant information, not mechanically but instead hydraulically connected to the output component 3.1.3 which is connected to the shaft 2.1 of the belt retraction device 2 for conjoint rotation. Force is therefore transmitted from the electric motor 3.3 to the output component 3.1.3 via the hydraulic fluid 3.1.1 which is an oil, for example, in particular a hydraulic oil. In other words: Conventionally, the electric motor 3.3 is mechanically coupled directly to the output component 3.1.3 such that the maximum torque of the electric motor 3.3 is directly transmitted to the output component 3.1.3. In this case, the output component 3.1.3 and the container 3.1.2 rotate together at the same speed. However, if an impending unavoidable collision is detected, and therefore a maximum tightening force is required, the electric motor 3.3 is mechanically decoupled from the output component 3.1.3 and hydraulically coupled to the output component 3.1.3. The hydraulic coupling of the electric motor 3.3 and the output component 3.1.3 is described in greater detail in the following.

The container 3.1.2 receiving the hydraulic fluid 3.1.1 is a cylindrical element comprising a receiving region 3.1.2.1 into which the hydraulic fluid 3.1.1 is filled. In the present embodiment, the receiving region 3.1.2.1 has an elliptical cross-section. An inner wall of the receiving region 3.1.2.1 in this case has a plurality of rib-like projections 3.1.2.2 projecting radially inwards. In the present embodiment, four projections 3.1.2.2 are provided which are equally distributed over a circumference of the receiving region 3.1.2.1.

Furthermore, the output component 3.1.3 or at least part of the output component 3.1.3 is arranged in the container 3.1.2, in particular in the receiving region 3.1.2.1. The output component 3.1.3 is in this case a spindle, for example, and arranged coaxially in the container 3.1.2. Furthermore, the output component 3.1.3 comprises two drive elements 3.1.3.1 projecting radially outwards and arranged opposite one another in the circumferential direction, as well as two lugs 3.1.3.2 projecting radially outwards and are likewise arranged opposite one another in the circumferential direction. The output component 3.1.3 has a first outer diameter $d_{A1}$ by means of the drive elements 3.1.3.1. The output component 3.1.3 has a second outer diameter $d_{A2}$ by means of the lugs 3.1.3.2, which diameter is smaller than the first outer diameter $d_{A1}$. The first outer diameter $d_{A1}$ of the output component 3.1.3 in this case corresponds to a first inner diameter of the receiving region 3.1.2.1 that is formed by means of two opposing rib-like projections 3.1.2.2. The second outer diameter $d_{A2}$ of the output component 3.1.3 in this case corresponds to a second inner diameter of the receiving region 3.1.2.1 that is formed by means of two opposing rib-like projections 3.1.2.2.

If the second ignition stage is activated, the container 3.1.2 is rotated about the rotational axis thereof, in the direction of the arrow shown, by means of the electric motor 3.3. In this case, a rotational speed of the container 3.1.2 is constant. Since the output component 3.1.3 is not mechanically coupled directly to the electric motor 3.3, the container 3.1.2, and therefore also the receiving region 3.1.2.1 comprising the projections 3.1.2.2, which region is filled with the hydraulic fluid 3.1.1, move relative to the output component 3.1.3. If the projections 3.1.2.2 reach the same angular position as the drive elements 3.1.3.1 and the lugs 3.1.3.2 during a rotation of the container 3.1.2, partial regions of the receiving region 3.1.2.1 are sealed from one another since the drive elements 3.1.3.1 and the lugs 3.1.3.2 abut the projections 3.1.2.2. This produces chambers K1 to K4 having different pressures since, as a result of the inertia, the hydraulic fluid 3.1.1 flows further in the drive direction and a pressure is therefore exerted on the drive elements 3.1.3.1 in the drive direction. In particular, chambers K1, K3 that are located behind the drive elements 3.1.3.1 in the drive direction have an increased pressure with respect to the other chambers K2, K4.

The drive elements 3.1.3.1 are subjected to this pressure and convey the pressure to the output component 3.1.3 to which the drive elements 3.1.3.1 are rigidly connected. As a result, the output component 3.1.3 rotates relative to the container 3.1.2 until the drive elements 3.1.3.1 and lugs 3.1.3.2 do not abut the projections 3.1.2.2 and the hydraulic fluid 3.1.1 can flow freely again. This short rotational movement occurs in pulses. Since the output component 3.1.3 is rigidly connected to the shaft 2.1 of the belt retraction device 2, this likewise rotates in pulses.

After the pulse-like rotational movement of the output component 3.1.3, the container 3.1.2 further rotates relative to the output component 3.1.3 until the projections 3.1.2.2 again reach the same angular position as the drive elements

3.1.3.1 and the lugs 3.1.3.2. This process repeats with each rotation of the container 3.1.2. As the number of rotations increases, the pulse-like rotational movements become asymptotically greater until a maximum value is reached. In so doing, a maximum torque of the output component 3.1.3 can be increased with respect to a direct coupling to an electric motor 3.3. The maximum torque is in this case comparable to a maximum torque when a pyrotechnic belt tightener is used.

Figure 3:
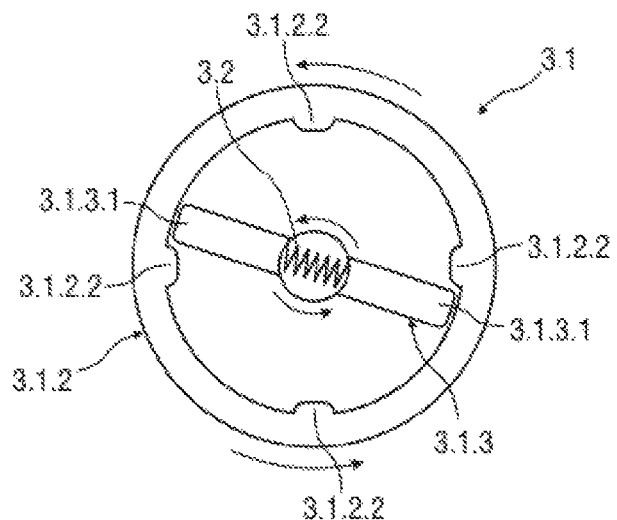
Figure 4:
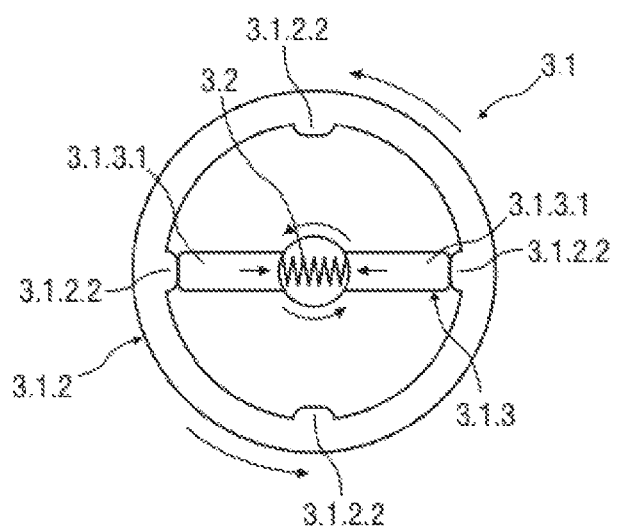
Figure 5:
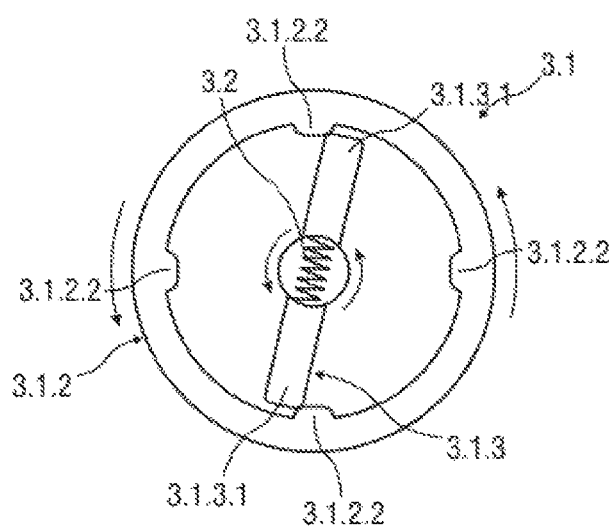

FIGS. 3 to 5 show an alternative embodiment of the impulse screw drive unit 3.1, in which the electric motor 3.3 is mechanically coupled to the output component 3.1.3 when the second ignition stage is activated.

Similar to FIG. 2, the container 3.1.2 is in this case designed as a cylindrical element comprising a receiving region 3.1.2.1, with no hydraulic fluid 3.1.1 being filled into the receiving region 3.1.2.1 in this case. The inner wall of the receiving region 3.1.2.1 likewise has a plurality of rib-like projections 3.1.2.2 projecting radially inwards. In the present embodiment, similar to FIG. 2, four projections 3.1.2.2 are provided which are equally distributed over a circumference of the receiving region 3.1.2.1.

Furthermore, the output component 3.1.3 or at least part of the output component 3.1.3 is arranged in the container 3.1.2, in particular in the receiving region 3.1.2.1, these not being shown in their entirety for the sake of clarity. The output component 3.1.3 comprises the drive elements 3.1.3.1 projecting radially outwards and arranged opposite one another in the circumferential direction.

The drive elements 3.1.3.1 are in this case coupled to a spring element 3.2 coaxially arranged in the receiving region 3.1.3. The spring element 3.2 is in this case arranged, in particular, between the drive elements 3.1.3.1. For example, the spring element 3.2 is a torsion spring. Furthermore, the spring element 3.2 is coupled to the electric motor 3.3, in a manner that is not shown, such that pretensioning of the spring element 3.2 can be influenced by means of the electric motor 3.3. For example, the spring element 3.2 is directly connected to an output shaft of the electric motor 3.3.

Similar to FIG. 2, the electric motor 3.3 is in this case also conventionally mechanically coupled directly to the output component 3.1.3, such that the maximum torque of the electric motor 3.3 is directly transmitted to the output component 3.1.3. In this case, the output component 3.1.3 and the container 3.1.2 rotate together at the same speed, as shown in FIG. 3. However, if an impending unavoidable collision is detected, and therefore a maximum tightening force is required, the second ignition stage is activated, the electric motor 3.3 being mechanically decoupled from the output component 3.1.3.

If the second ignition stage is activated, the container 3.1.2 is rotated about the rotational axis thereof, in the direction of the arrow shown, by means of the electric motor 3.3. In this case, a rotational speed of the container 3.1.2 is constant. Since the output component 3.1.3 is not mechanically coupled directly to the electric motor 3.3, the container 3.1.2 and therefore also the receiving region 3.1.2.1 comprising the projections 3.1.2.2 move relative to the output component 3.1.3 and therefore to the drive elements 3.1.3.1. If the drive elements 3.1.3.1 reach the same angular position as two opposing projections 3.1.2.2 during a rotation of the container 3.1.2, the relative movement of the container 3.1.2 with respect to the drive elements 3.1.3.1 is stopped such that the spring element 3.2 connected to the electric motor 3.3 is pretensioned. The pretensioning of the spring element 3.2 in this case causes the drive elements 3.1.3.1 to be drawn together radially inwards, as shown in FIG. 4. As a result, the drive elements 3.1.3.1 can pass over the projections 3.1.2.2, and the output component 3.1.3 can rotate relative to the container 3.1.2 for a short period of time until the drive elements 3.1.3.1 have passed over the projections 3.1.2.2.

This short rotational movement occurs in pulses and is generated based on speed differences between the container 3.1.2 and the drive elements 3.1.3.1, in particular when a defined torque is exceeded, and on the basis of a mass of the drive elements 3.1.3.1. Since the output component 3.1.3 is rigidly connected to the shaft 2.1 of the belt retraction device 2, this likewise rotates in pulses.

After the pulse-like rotational movement of the output component 3.1.3, the container 3.1.2 rotates further relative to the output component 3.1.3 until the drive elements 3.1.3.1 again reach the same angular position as two further projections 3.1.2.2, as shown in FIG. 5. This process repeats with each rotation of the container 3.1.2. As the number of rotations increases, the pulse-like rotational movements become asymptotically greater until a maximum value is reached. The impulse screw drive unit 3.1 comprising the spring element 3.2 described herein is particularly cost-effective and can be produced so as to be lightweight.

Furthermore, the impulse screw drive unit 3.1 can be provided with a catch mechanism (not shown), e.g., pawls, which at least reduce the rebound of the output component 3.1.3.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A belt tightener for tightening a safety belt in a vehicle, the belt tightener comprising:
   an impulse screw drive unit.

2. The belt tightener of claim 1, wherein the impulse screw drive unit comprises:
   an electric motor;
   a container filled with a hydraulic fluid; and
   an output component,
   wherein the electric motor is operatively connected to the container for conjoint rotation, and
   wherein the output component is at least partially arranged inside the container.

3. The belt tightener of claim 2, wherein the container comprises a receiving region configured to receive the hydraulic fluid, the receiving region having an elliptical cross-section.

4. The belt tightener of claim 3, wherein
   the output component is a spindle having at least one drive element projecting radially outwards in the receiving region of the container, the output component has at least one outer diameter defined by the at least one drive element, wherein the at least one outer diameter corresponds to an inner diameter of the receiving region formed by two opposing rib-like projections.

5. The belt tightener of claim 1, wherein the impulse screw drive unit comprises:
an electric motor;
a container;
a spring coupled to the electric motor; and
an output component coupled to the spring,
wherein the electric motor is operatively connected to the container for conjoint rotation, and
wherein the output component is at least partially arranged inside the container.

6. The belt tightener of claim 5, wherein
the output component is a spindle having at least one drive element projecting radially outwards in a receiving region of the container,
the output component has at least one outer diameter defined by the at least one drive element, wherein the at least one outer diameter corresponds to an inner diameter of the receiving region formed by two opposing rib-like projections.

7. A safety belt device of a vehicle, comprising:
a belt retractor, comprising a shaft operatively configured to unwind and wind a safety belt in the vehicle; and
a belt tightener comprising an impulse screw drive unit.

8. The safety belt device of claim 7, wherein an output component of the impulse screw drive unit is operatively connected to the shaft for conjoint rotation.

9. The safety belt device of claim 7, further comprising:
a controller coupled to the belt tightener,
wherein the controller is operatively coupled to a plurality of collision detectors that provide collision-relevant information, and
wherein the controller is configured to generate a control signal based on the detected collision-relevant information in order to activate the belt tightener.

10. A method for operating a safety belt device of a vehicle, the safety belt device comprising a belt retractor, comprising a shaft operatively configured to unwind and wind a safety belt in the vehicle and a belt tightener coupled to a controller and comprising an impulse screw drive unit, wherein the impulse screw drive unit comprises an electric motor, a container, and an output component, the method comprising:
activating, by the controller, the belt tightener and specifying, by the controller, a tightening force based on collision-relevant information before occurrence of a detected impending collision of the vehicle;
activating a first ignition stage of the belt tightener at a specific tightening force; and
activating a second ignition stage of the belt tightener at a further specific tightening force,
wherein the further specific tightening force that activates the second ignition stage is higher than the specific tightening force that activates the first ignition stage,
wherein, in the first ignition stage, the output component is rotated so as to correspond with the electric motor, and
wherein, in the second ignition stage, the output component is rotated relative to the electric motor in a pulse-like manner.

* * * * *